US010363500B2

(12) United States Patent
Keller

(10) Patent No.: US 10,363,500 B2
(45) Date of Patent: Jul. 30, 2019

(54) DOUBLE-ACTION PUSHER CENTRIFUGE AND PUSHER BASE DEVICE

(71) Applicant: Ferrum AG, Rupperswil (CH)

(72) Inventor: Nik Keller, Effrektion (CH)

(73) Assignee: FERRUM AG, Rupperswil (CH)

( * ) Notice: Subject to any disclaimer, the term of this patent is extended or adjusted under 35 U.S.C. 154(b) by 698 days.

(21) Appl. No.: 14/735,634

(22) Filed: Jun. 10, 2015

(65) Prior Publication Data

US 2015/0367260 A1   Dec. 24, 2015

(30) Foreign Application Priority Data

Jun. 24, 2014  (EP) ..................... 14173652

(51) Int. Cl.
*B01D 33/00* (2006.01)
*B01D 33/46* (2006.01)
(Continued)

(52) U.S. Cl.
CPC .............. *B01D 33/46* (2013.01); *B01D 33/11* (2013.01); *B01D 33/48* (2013.01); *B01D 33/54* (2013.01); *B01D 45/08* (2013.01); *B01D 45/16* (2013.01); *B04B 3/02* (2013.01); *B04B 11/06* (2013.01); *B01D 33/06* (2013.01); *B01D 33/067* (2013.01);
(Continued)

(58) Field of Classification Search
CPC ...... B01D 33/46; B01D 33/06; B01D 33/067; B01D 33/07; B01D 33/073; B01D 33/70; B01D 33/72; B01D 33/48; B01D 33/11; B01D 33/76; B01D 33/54; B01D 45/08; B01D 45/16; B04B 3/02; B04B 3/00; B04B 11/06; B04B 15/06; B04B 15/12;
(Continued)

(56) References Cited

U.S. PATENT DOCUMENTS 1,944,391 A * 1/1934 Altpeter .................... B04B 3/02
                                                     210/360.1
4,434,052 A * 2/1984 Mulhaupt ................. B04B 3/02
                                                     210/376
(Continued)

FOREIGN PATENT DOCUMENTS

CN              1036714 A       11/1989
CN            200988003 Y       12/2007
(Continued)

*Primary Examiner* — Dung H Bui
(74) *Attorney, Agent, or Firm* — Global IP Counselors, LLP

(57) ABSTRACT

A double-action pusher centrifuge separates a mixture into solid cake and liquid. The pusher centrifuge includes a screen drum rotatable about an axis and in which a pusher base device is arranged to be movable along the axis of rotation. The solid cake is displaced by an outer ring region of the pusher base device. A plurality of axial passage openings are disposed in the outer ring region and connect front and rear regions of the screen drum. A feed unit is arranged at an inflow disk such that the mixture can be introduced via the feed unit and the inflow disk into empty space on the screen drum on displacement of the solid cake. An inflow gap applies the mixture into the empty space, and is between an inflow edge of the inflow disk and a pusher base plate of the pusher base device with an inflow region.

10 Claims, 9 Drawing Sheets

(51) Int. Cl.
*B01D 45/08* (2006.01)
*B01D 45/16* (2006.01)
*B04B 3/02* (2006.01)
*B04B 11/06* (2006.01)
*B01D 33/11* (2006.01)
*B01D 33/54* (2006.01)
*B01D 33/48* (2006.01)
*B01D 33/06* (2006.01)
*B01D 33/067* (2006.01)
*B01D 33/073* (2006.01)
*B01D 33/72* (2006.01)
*B64D 33/02* (2006.01)
*F02C 7/05* (2006.01)
*F02C 7/052* (2006.01)

(52) U.S. Cl.
CPC ............ *B01D 33/073* (2013.01); *B01D 33/72* (2013.01); *B64D 33/02* (2013.01); *B64D 2033/0246* (2013.01); *F02C 7/05* (2013.01); *F02C 7/052* (2013.01); *Y02T 50/671* (2013.01)

(58) Field of Classification Search
CPC .......... F02C 7/052; F02C 7/05; Y02T 50/671; B64D 33/02; B64D 2033/0246
See application file for complete search history.

(56) References Cited

U.S. PATENT DOCUMENTS

| | | | | |
|---|---|---|---|---|
| 4,889,627 A | * | 12/1989 | Hoppe | B04B 3/02 210/360.2 |
| 5,205,933 A | * | 4/1993 | Bernd | B04B 3/02 210/374 |
| 5,356,366 A | * | 10/1994 | Stahl | B04B 3/02 210/376 |
| 5,468,389 A | * | 11/1995 | Keller | B04B 3/02 210/360.2 |
| 5,958,235 A | * | 9/1999 | Leung | B04B 1/20 210/360.1 |

FOREIGN PATENT DOCUMENTS

| | | |
|---|---|---|
| CN | 201223828 Y | 4/2009 |
| CN | 102284383 A | 12/2011 |
| CN | 102847616 A | 1/2013 |
| DE | 2706501 A1 | 8/1978 |
| DE | 4308749 C1 | 4/1994 |
| EP | 0068095 A2 | 1/1983 |
| EP | 0635309 A1 | 1/1995 |

* cited by examiner

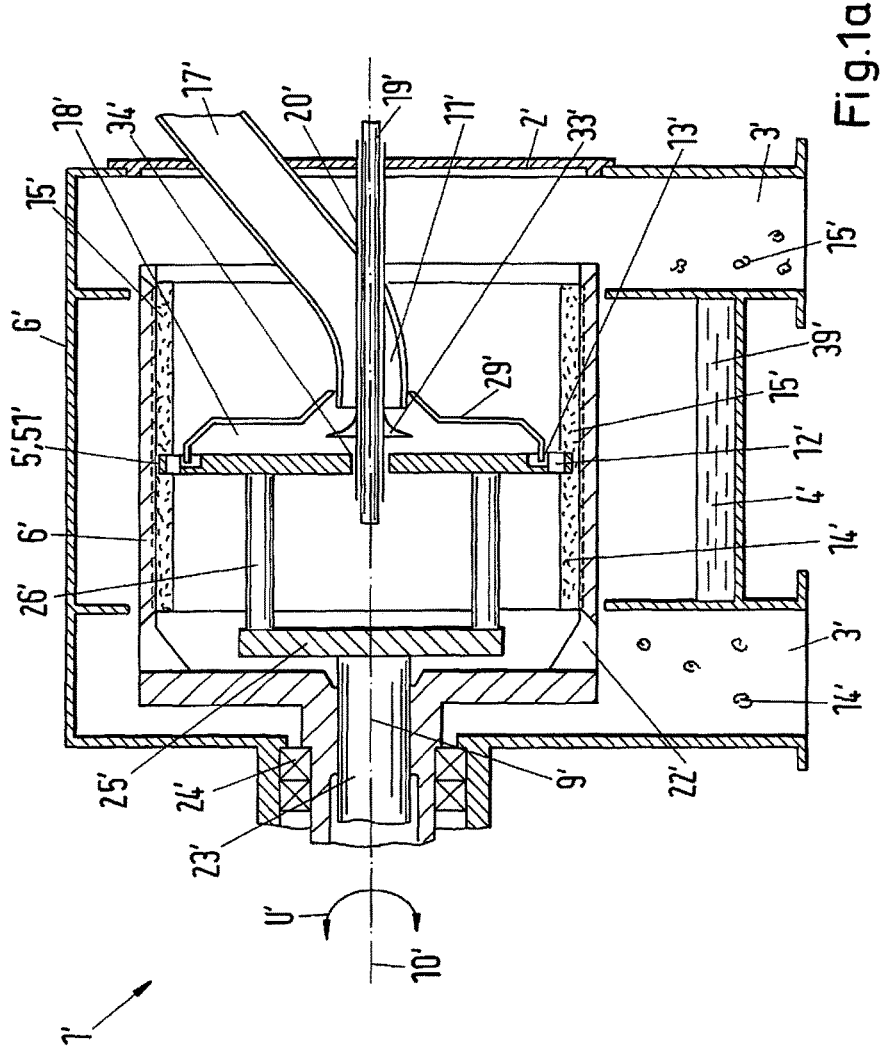

DOUBLE-ACTION PUSHER CENTRIFUGE AND PUSHER BASE DEVICE

CROSS-REFERENCE TO RELATED APPLICATIONS

This application claims priority to EP Patent Application 14173652.0, filed Jun. 24, 2014, the contents of which is hereby incorporated herein by reference.

BACKGROUND

Field of the Invention

The invention relates to a double-action pusher centrifuge and to a pusher base device for a double-action pusher centrifuge.

Background Information

Centrifuges in the most varied embodiments are widespread and are used in the most varied fields for the dehumidification of moist substances or moist substance mixtures. Discontinuously operating centrifuges such as scraper centrifuges are thus, for example, preferably used for the drying of very pure pharmaceutical products, whereas continuously operating pusher centrifuges are advantageously used in particular when large amounts of a solid-liquid mixture are to be separated continuously. In this respect, depending on the demand, single-stage or multi-stage pusher centrifuges as well as so-called double-action pusher centrifuges can be used.

In the different types of the last-named class of pusher centrifuges, a solid-liquid mixture, for example a suspension or a moist salt or salt mixture, is supplied through an inflow tube via a mixture distributor to a fast-rotating screen drum which is configured as a filter screen so that the liquid phase is separated by the filter screen due to the action of the centrifugal forces, whereas a solid cake is deposited in the interior at the drum wall. In this respect, a substantially disk-shaped pusher base device is arranged in the rotating drum; it rotates along synchronously and oscillates at a specific amplitude in an axial direction in the screen drum such that a portion of the dried solid cake is pushed out at an end of the screen drum. On the opposite movement of the pusher base device, a region of the drum is released which is adjacent to the pusher base device and which can then again be loaded with new mixture.

Double-action pusher centrifuges in this respect have the advantage with respect to the single-stage or multi-stage pusher centrifuges that an empty space into which fresh mixture can be introduced for dehumidification arises on the rear side of the pusher base device during the axial expulsion movement which the pusher base device makes in one direction to expel the solid cake. Mixture can thus be continuously introduced into the screen drum by a suitable reversal of the feed with mixture to the respective opposite side of the pusher base device.

EP 0 068 095 A2 e.g. thus teaches a double-action pusher centrifuge having a central passage opening at the pusher base device whose edge is used as a control edge in order necessarily to reverse the mixture from a spatially fixed radial feed onto the front side or rear side of the pusher base device respectively in dependence on the positon of the pusher base. It is essential in this respect that the two drum halves are charged by the same quantities of mixture in front of and behind the pusher base device. The axial position of the radial feed therefore has to be set very exactly, wherein the position has to be located experimentally in a complex manner via the measurement of the two mixture flows.

The disadvantages of a centrifuge in accordance with EP 0 068 095 A2 are obvious: with abrading products, changes in the geometry of the inlet pipe can result in an unequal distribution of the mixture in the long term. In addition, natural fluctuations in the quantity of the fed-in mixture result in an uneven distribution of the mixture in the region in front of and behind the pusher base device. In principle, an increased restriction of the mixture flow at the outlet of the radial infeed can admittedly prevent such quantity fluctuations. However, the required inflow height has to be present for a sufficient restriction. And, on the other hand, with a reduced outlet opening, the risk of a backlog of mixture and ultimately also the risk of clogging is present.

These disadvantages have already been clearly recognized some time ago. A double-action pusher centrifuge was therefore proposed by EP 0 635 309 A1 which has a plurality of axial passage openings at both sides in an outer ring region of the pusher base device, the axial passage openings connecting the region in front of and behind the pusher base device, being able to be fed in each case from the center of the pusher base device via associated radial feed openings within the pusher base device and diverting the mixture at both sides in the axial direction to conduct it against the expulsion movement of the pusher base device to that drum side on which the pusher base device accordingly moves away from the solid cake.

For a better understanding of the current invention, the invention in accordance with EP 0 635 309 A1 will be briefly described in the following, which has admittedly proved very successful in practice for eliminating the above-described problems, but, as was found later, likewise still has potential for improvement, which is exploited by the present invention.

For the better distinguishing of the present invention from the prior art in accordance with FIG. 1a to FIG. 1d, the reference numerals of FIG. 1a to FIG. 1d, which refer to features of the known solution in accordance with EP 0 635 309 A1, are provided with a dash, whereas the reference numerals of the following FIGS. 2 to 7, which relate to embodiments in accordance with the invention, have no dash.

The known double-action pusher centrifuge 1' in accordance with FIG. 1a and FIG. 1b respectively, with reference to which the pusher base device 5' of FIG. 1a is shown in a section in a little more detail, comprises a screen drum 6' which is supported at one side via bearings 24' in a housing G'. In a middle region of the housing G', a filtrate housing 4' is provided in which liquid 39' is collected which has been centrifuged out, while the solid cake 14', 15' is pushed toward the outside into a corresponding solid housing 3' by an axially oscillating pusher base device 5' in each case along the drum jacket surface. At the bearing side, a plurality of outlet openings 22' for the rear solid cake 14' are provided in the screen drum. The pusher base device 5' itself is connected via pins 26' and a pusher hub 25' to a piston rod 23' which is in turn axially movable supported in the axle 9' of the screen drum 6' to carry out an axially oscillating movement during the rotation about the rotational axis 10' with the screen drum 6', the oscillating movement being transferred from the pusher base device 5' at its periphery to the solid cakes 14', 15'. The housing 1' is closed by a housing cover 2'. A feed unit 11' is provided at the housing cover 2' in the form of a pipe for a mixture 17' which is pierced coaxially at an outlet by a support pipe 20', wherein the support pipe 20' supports a deflector 33' which deflects the mixture 17' in the radial direction. The support pipe 20' reaches the rear space of the screen drum 6' through a central opening 34' in the pusher base device 5' and makes it possible to introduce flushing liquid or washing liquid into the rear space via one or more inwardly disposed pipes 19'.

A ring space 18' is generated by a cover 29' placed on the front side of the pusher base apparatus 5' and from this a plurality of radial feed openings 13' respectively merge into axial passage openings 12' which are arranged in an outer ring region 51' of the pusher base device 5' in the region of the filter cakes 14', 15'. In the operating state, mixture 17' is radially introduced in the region between the pulled-forward cover rim and the actual pusher base and is further accelerated via the friction at the walls into a ring space 18' in which, as can be seen from FIG. 1c, chicanes are arranged in the form of pockets 28' to accelerate the mixture in the pockets 28' to peripheral speed. The respective radial feed openings 13' are cut out between the cover 29' and the pockets 28' and the mixture 17' moves through them into respective axial passage openings 12' which connect the front space and the rear space of the screen drum 6'.

In the operating state, the mixture 17' attempts to distribute itself in both directions axially and in the peripheral direction U' at the outlet from the passage openings 12', wherein the deposited filter cake 14' stands in the way on the side in the direction of the expulsion movement 27', while an empty space 16' in which new mixture 17' can be introduced arises at the opposite side.

An axial passage opening 12' which takes up a whole ring gap section 30' in accordance with FIG. 1d is shown in detail with somewhat more precision with reference to FIG. 1c and FIG. 1d, which shows a plan view of the pusher base device 5' with a removed cover 29' from direction I in accordance with FIG. 1c. In this respect, the pockets 28' are set forward in the direction of rotation 32' to effect a more uniform inflow in the ring gap cross-section 30'. The cover 29' is supported in the actual pusher base at an incision 31' by a shoulder which simultaneously forms a boundary for the radial feed openings 13' in the region of the pockets 28'.

SUMMARY

Although the initially described problems were already largely remedied by the known double-action pusher centrifuge in accordance with EP 0 635 309 A1 described here, there are nevertheless certain problems which require improvement.

Since the cover 29' always reaches into the pocket 28' above the passage openings 12' in its function as an inflow disk, very high acceleration forces are exerted onto the mixture 17', which has the consequence of a correspondingly high wear in the passage openings 12' and can also have harmful effects on the product itself. The mixture 17' is thus accelerated in a very short time to the full peripheral speed of the screen drum 6'. In particular with sensitive substances, this can inter alia result in grain fracture, that is that, for example solid grains which are distributed in a suspension supplied to the centrifuge, burst into smaller pieces in an uncontrolled manner on the abrupt acceleration process, which can have negative effects on the quality of the produced solid cake if, for example, the particle size of the grains in the end product plays a role.

It is thus the object of the invention to provide an improved double-action pusher centrifuge or an improved pusher base apparatus for a double-action pusher centrifuge with which the initially described problems with the abrupt accelerations of the mixture to be dehumidified can be significantly reduced or more or less completely avoided.

The invention thus relates to a double-action pusher centrifuge for separating a mixture into a solid cake and into a liquid which double-action pusher centrifuge comprises a screen drum which is rotatable about an axis of rotation and in which a pusher base device is arranged movable to and fro along the axis of rotation such that the solid cake in the operating state is displaceable in the screen drum alternately by means of an outer ring region of the pusher base device. In this respect, a plurality of axial passage openings are provided in the outer ring region of the pusher base device which connect a front region and a rear region of the screen drum, wherein a feed unit is provided which is arranged at an inflow disk such that the mixture can be introduced via the feed unit and the inflow disk into the empty space arising on a displacement of the solid cake on the screen drum. In accordance with the invention, an inflow gap which is not interrupted in the peripheral direction and via which the mixture can be applied into the empty space on the screen drum is formed between an inflow edge of the inflow disk and a pusher base plate of the pusher base device with an inflow region.

It is decisive for the present invention that an inflow gap which is not interrupted in the peripheral direction and via which the mixture can be applied into the empty space on the screen drum is formed between the inflow edge of the inflow disk and the pusher base plate of the pusher base device. As will be described in more detail below, there are different possibilities to configure and arrange the inflow gap. It is primarily decisive that the inflow gap forms a gap or passage not interrupted in the peripheral ring. The mixture can therefore be preaccelerated a lot more gently:

In this respect, the preacceleration of the mixture is able to take place independently of the specific embodiment of the inflow gap itself, e.g. when the inflow gap is formed in the pusher base plate and the inflow edge reaches into the inflow gap. Or when the inflow disk is formed at a predefinable spacing in front of the pusher base plate so that the inflow gap is simply defined by a spacing gap, that is by the free space between the inflow edge and the pusher base plate. In this case, the mixture can be preaccelerated at least partly on the product itself, that is on the solid cake, and can subsequently pass through the axial passage openings into the empty space on the screen drum.

In specific cases, a combination of these two embodiment variants is also suitable. This means a first inflow gap can be formed in the pusher base plate, with the inflow edge, however, not reaching into the first inflow gap, whereby a second inflow gap is automatically formed between the inflow edge and the pusher base plate. Depending on how the spacing between the inflow edge and the pusher base plate is adjusted and how the exact geometry of the first inflow gap is selected, more or less mixture can be preaccelerated on the product or a combined preacceleration can take place in the first inflow gap and on the solid cake.

Irrespective of which embodiment is selected in practice, it is primarily decisive that the inflow gap forms a gap or channel which is not interrupted in the peripheral direction, whereby the mixture can be preaccelerated at lot more gently than e.g. with a double-action pusher centrifuge in accordance with EP 0 635 309 A1.

The double-action pusher centrifuge in accordance with EP 0 635 309 A1 namely has no peripheral inflow gap in accordance with the present invention. The cover of the pusher base apparatus rather always reaches into the pockets above the passage openings in its function as an inflow disk and the pockets are actually bounded in the peripheral direction and thus not do form an inflow gap which is not interrupted in the peripheral direction as in the present invention. Chicanes for the inflowing mixture are rather formed by the design in accordance with EP 0 635 309 A1, which has the result that very high acceleration forces are exerted onto the mixture, which has the consequence of a correspondingly high wear in the passage openings and can also have harmful effects on the product itself, as initially described in detail. All these disadvantages and problems are thus avoided for the first time by the double-action pusher centrifuge of the present invention.

In an embodiment which is particularly important for practice, a preacceleration device can additionally also be provided in the inflow region of the pusher base device for a further improvement of the preacceleration of the mixture. It can e.g. comprise vanes which are shaped and arranged in a suitable manner and then form a so-called acceleration cross. The vanes of the preacceleration device can e.g. be spirally curved outside the inflow pipe of the feed device or can be suitably configured in any other manner known per se to the skilled person.

Alternatively or additionally to the preacceleration device, a distribution ring can also be provided in the inflow region of the pusher base device, in particular between the preacceleration device and the screen drum, which makes it possible to distribute the mixture more evenly in the peripheral direction.

Depending on the design of the cleaning of the rear drum side, a flushing pipe can be provided in a known manner for introducing washing and/or flushing liquid into the screen drum which can extend through the feed device and through the pusher base device from the front region into the rear region of the screen drum.

The pusher base device can specifically be of double-wall design in the outer ring region. In this respect, the ring region of double-wall design can be provided with a terminating band in the direction toward the screen drum or it is also possible in another embodiment that the passage openings of the ring region of double-wall design are open in the direction toward the screen drum. It is self-explanatory that the passage openings can also be open in the direction toward the screen drum with an outer ring region not configured as of continuous double-wall design.

Furthermore, as already known per se, wear rings can be provided at the outer ring region as wear protection.

The invention furthermore relates to a pusher base device for a double-action pusher centrifuge of the present invention. The pusher base device in accordance with the invention for a double-action pusher centrifuge for separating a mixture into a solid cake and into a liquid comprises in an outer ring region a plurality of axial passage openings which connect a front region and a rear region of a screen drum of the double-action pusher centrifuge in the installed state. The pusher base apparatus further comprises an inflow disk so that the mixture can be introduced into an empty space arising on the screen drum on a displacement of the solid cake via the inflow disk in the operating state. In accordance with the invention, an inflow gap which is not interrupted in the peripheral direction and via which the mixture can be applied into the empty space on the screen drum is formed between an inflow edge of the inflow disk and a pusher base plate of the pusher base device with an inflow region.

In a preferred embodiment, the inflow gap is configured in the form of a peripheral inflow groove in the pusher base plate, wherein the inflow gap can, however, alternatively or additionally be configured as a spacing gap between the inflow edge and the pusher base plate. Preferably, but not necessarily, the inflow edge extends into the inflow groove.

In practice, a preacceleration device can particularly advantageously be provided in the inflow region of the pusher base device for preaccelerating the mixture. Alternatively, or particularly preferably additionally, a distribution ring can be arranged in the inflow region, in particular between the preacceleration device and the screen drum.

In this respect, the pusher base device can have a double-wall design in the outer ring region, for example, with a termination band preferably but not necessarily being able to be formed at the ring region of double-wall design in the direction toward the screen drum. In this respect, it is also possible in another embodiment that the passage openings of the ring region of double-wall design are open in the direction toward the screen drum, with open passage openings naturally also being possible with a ring region not of continuously double-wall design.

To minimize the wear at the outer ring region, wear rings can moreover be provided in a manner known per se at the outer ring region.

BRIEF DESCRIPTION OF THE DRAWINGS

The invention will be explained in more detail in the following with reference to the schematic drawings.

FIG. 1a is a double-action pusher centrifuge known from the prior art;

FIG. 1b is a detailed drawing of a pusher base device in accordance with FIG. 1a;

DETAILED DESCRIPTION OF EMBODIMENTS

FIGS. 1a to 1d show an example of a double-action pusher centrifuge which is known from the prior art, which was already initially discussed in detail and which therefore no longer has to be discussed at this point.

Figure 1B:
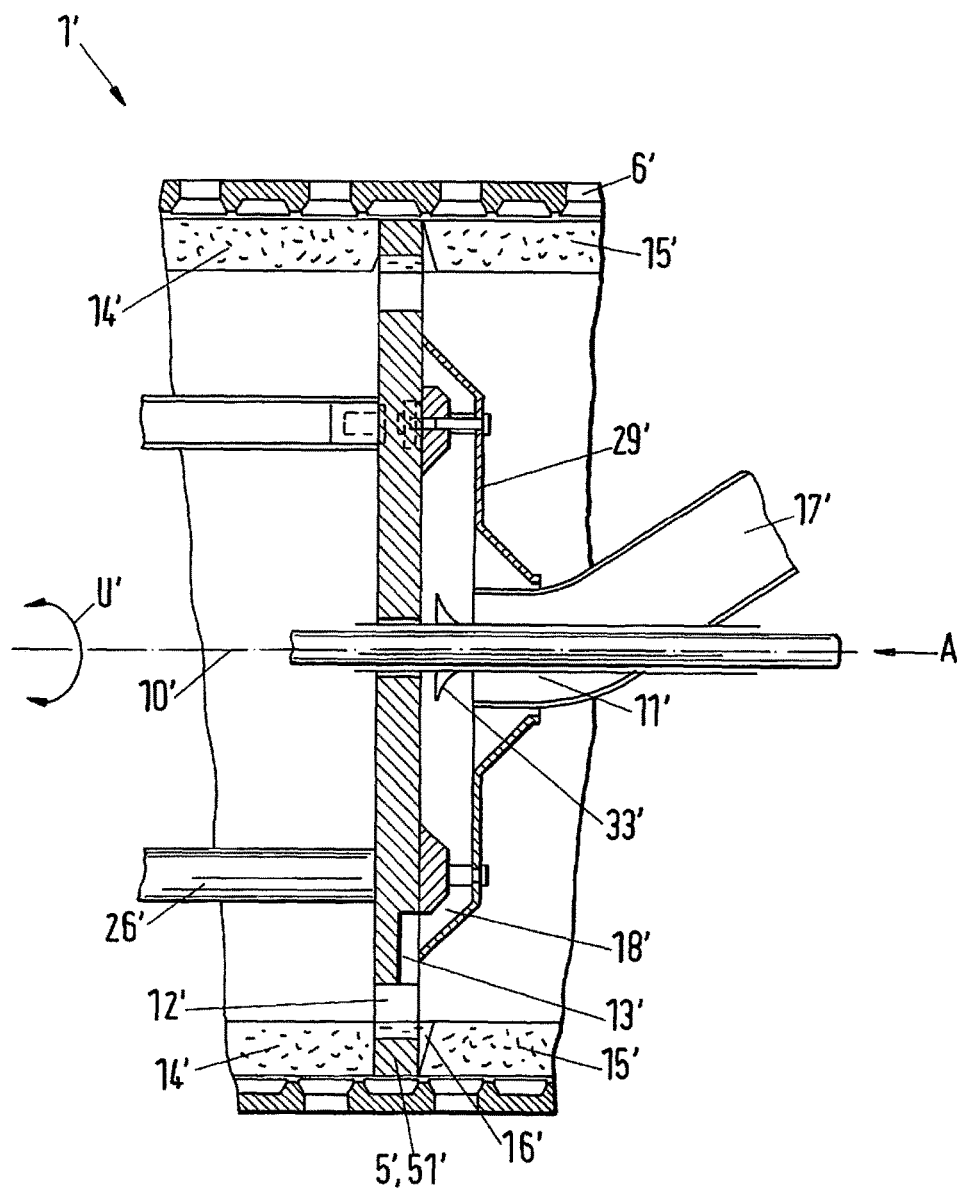
Figure 1C:
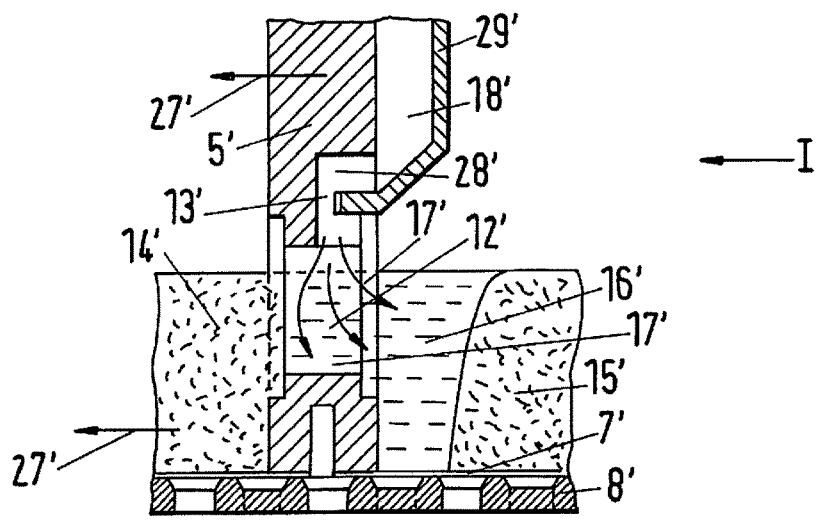
FIG. 1c is a detail in accordance with FIG. 1b.
Figure 1D:
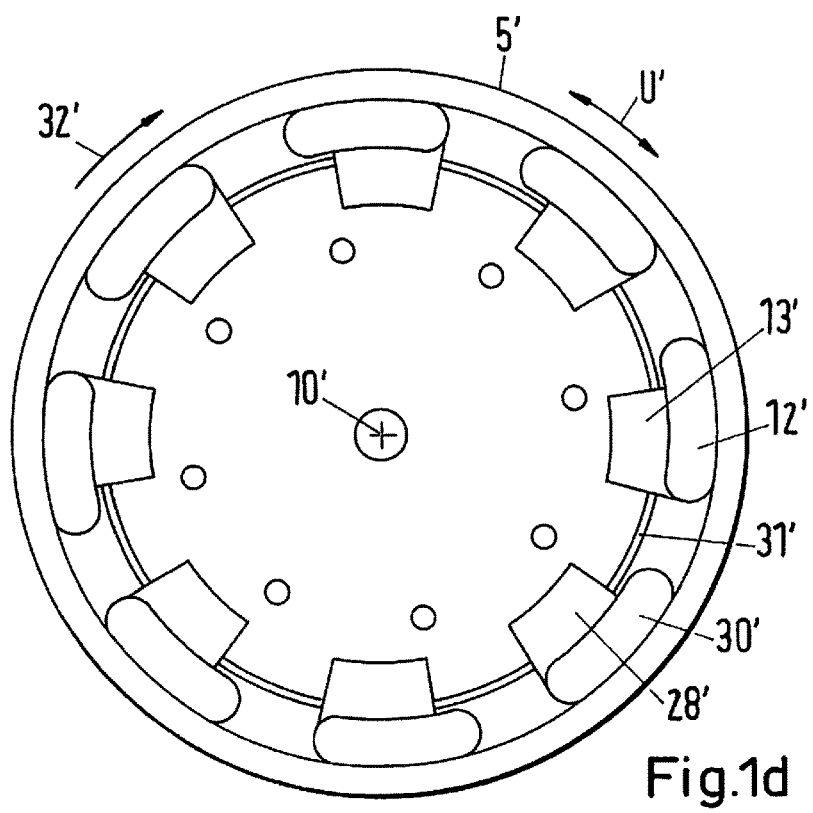
FIG. 1d is the pusher base device in accordance with FIG. 1c from the direction of view A.
Figure 2:
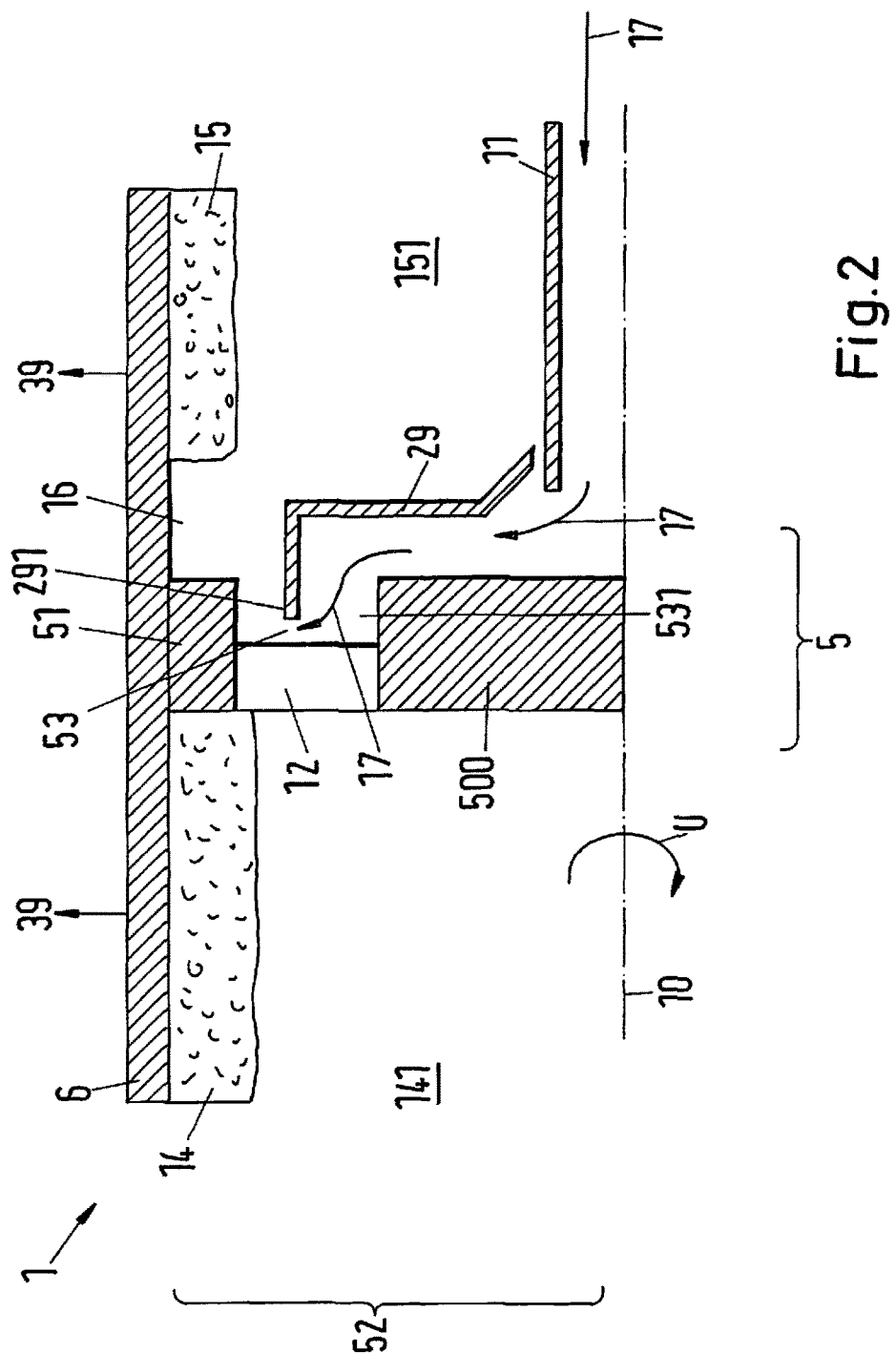
FIG. 2 is a first embodiment of a double-action pusher centrifuge in accordance with the invention.

FIG. 2 shows in section in a highly schematic representation, major components of a first embodiment of a double-action pusher centrifuge in accordance with the invention by way of example. In this respect, the double-action pusher centrifuge of the present invention can be considered as a further development of the known double-action pusher centrifuge in accordance with FIG. 1a-FIG. 1d at least for special embodiments, with the major difference being able to be seen in the inflow gap which is not interrupted in the peripheral direction and which is lacking in the known double-action pusher centrifuges.

The double-action pusher centrifuge in accordance with the invention of FIG. 2, which is designated by the reference numeral 1 in total, serves for the separation of a mixture 17 into a solid cake 14, 15 and into a liquid 39.

The double-action pusher centrifuge 1 comprises in a manner known per se a screen drum 6 which is rotatable about an axis of rotation 10 and in which a pusher base device 5 is arranged movable to and fro along the axis of rotation 10 so that the solid cake 14, 15 is displaceable alternately in the screen drum 6 in the operating state by means of an outer ring region 51 of the pusher base device 5. A plurality of axial passage openings 12 are provided in the outer ring region 51 of the pusher base device 5 which connect a front region 151 and a rear region 141 of the screen drum 6. Furthermore, a feed unit 11 arranged at an inflow disk 29 is provided at the pusher base device such that the mixture 17 can be introduced via the feed unit 11 and the inflow disk 29 into the empty space 16 arising on the screen drum 6 on a displacement of the solid cake 14, 15. In accordance with the present invention, an inflow gap 53 which is not interrupted in the peripheral direction U and via which the mixture 17 can be applied into the empty space 16 on the screen drum 6 is formed between an inflow edge 291 of the inflow disk 29 and a pusher base plate 52 of the pusher base device 5 with an inflow region 500.

In the specific embodiment of FIG. 2, the inflow gap 53 is configured in the form of a peripheral inflow groove 531 in the pusher base plate 52. The inflow groove 531 can e.g. be milled into the body of the pusher base plate 52 in the peripheral direction U in the region of the passage openings 12. The inflow edge 291 extends into the peripheral inflow groove 531, whereby the mixture 17 can be preaccelerated within the inflow gap 53 and the passage openings 12 as well as further components are loaded correspondingly less by wear.

Figure 3:
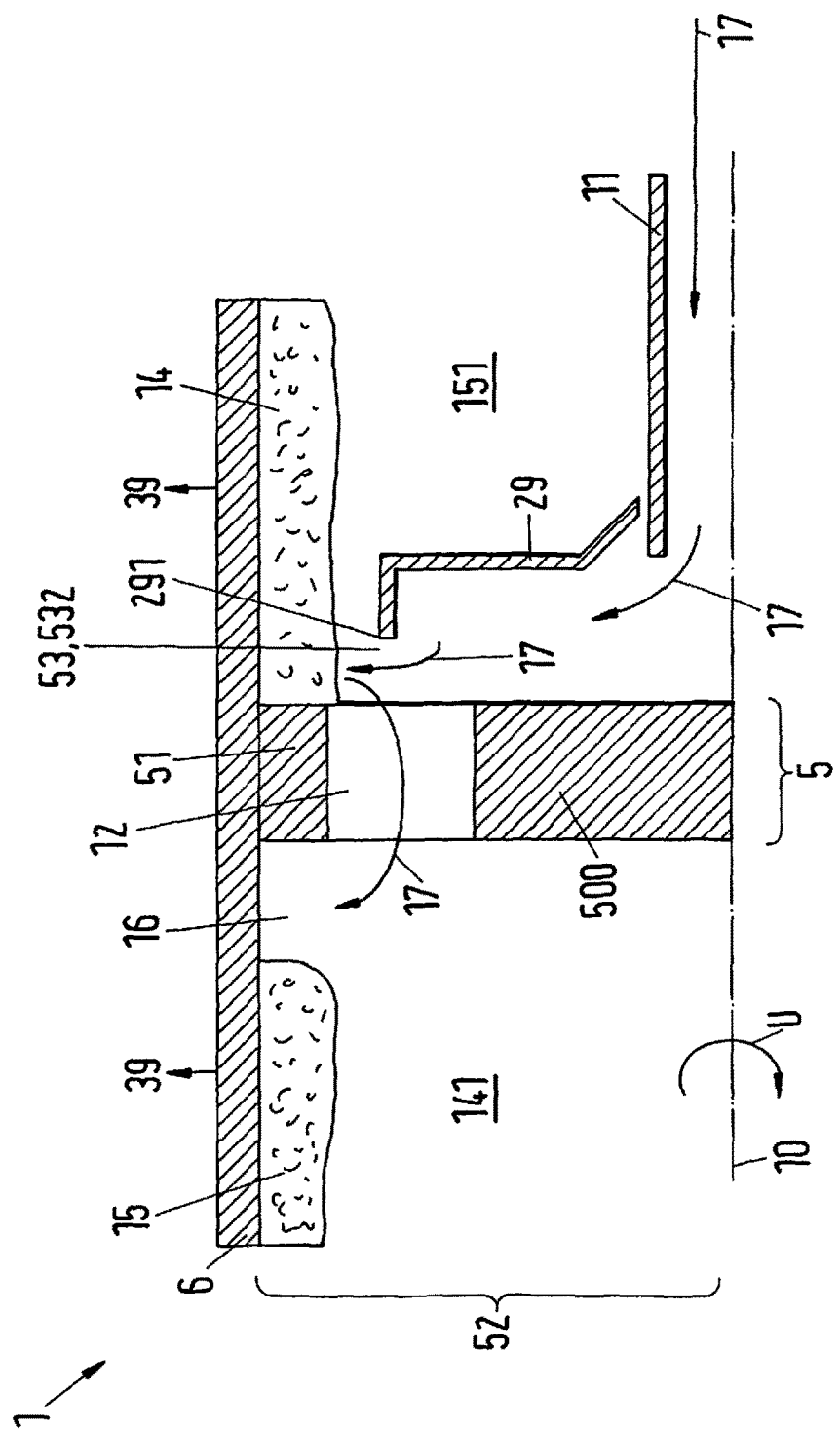
FIG. 3 is a second embodiment of a double-action pusher centrifuge in accordance with the invention.

FIG. 3 shows a second embodiment of a double-action pusher centrifuge 1 in accordance with the invention in which in contrast to the example of FIG. 2 the inflow groove 531 is missing and instead the inflow gap 53 is formed as a spacing gap 532 between the inflow edge 291 and the pusher base plate 52, with the remaining components of the double-action pusher centrifuge 1 of FIG. 3 otherwise in principle being configured analog to the corresponding components of the double-action pusher centrifuge 1 in accordance with FIG. 2.

Figure 4:
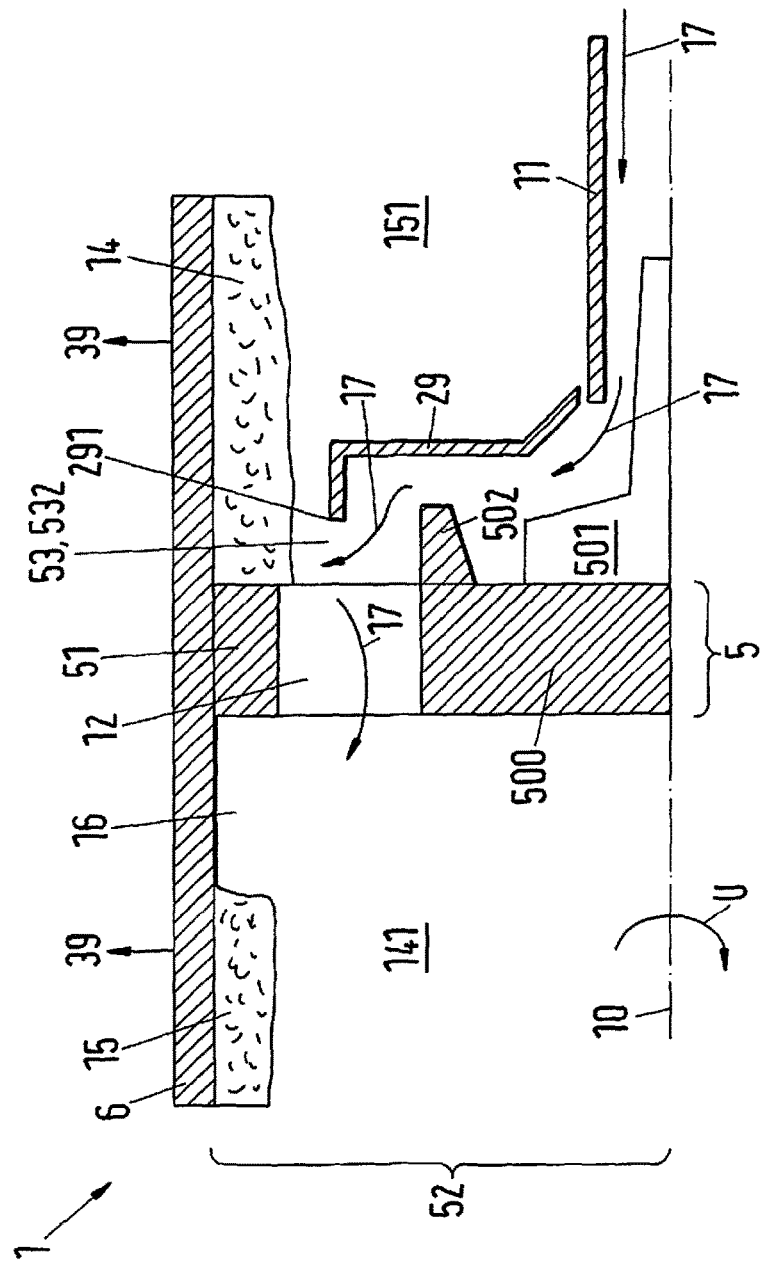
FIG. 4 is a third embodiment with a distribution ring and a preacceleration device.

FIG. 4 shows a third embodiment having a distribution ring 502 and a preacceleration device 501. The preacceleration device 501 in this respect serves for the further improvement of the preacceleration of the mixture 17 in the inlet region 500 of the pusher base device 5. The vanes of the preacceleration device 501 can in this respect, for example, be formed spirally outside the feed unit 11. In addition, a distribution ring 502 is provided between the preacceleration device 501 and the screen drum 6 at a somewhat larger diameter in the inflow region 500. The distribution ring 502 in this respect allows an even more uniform distribution of the mixture over the pusher base plate 52. It is self-explanatory in this respect that in very specific embodiments, only the distribution ring 502 or only the preacceleration device 501 can also be present and both the distribution ring 502 and the preacceleration device 501 can e.g. also advantageously be used in an embodiment in accordance with FIG. 2 with an inflow groove 531.

Figure 5:
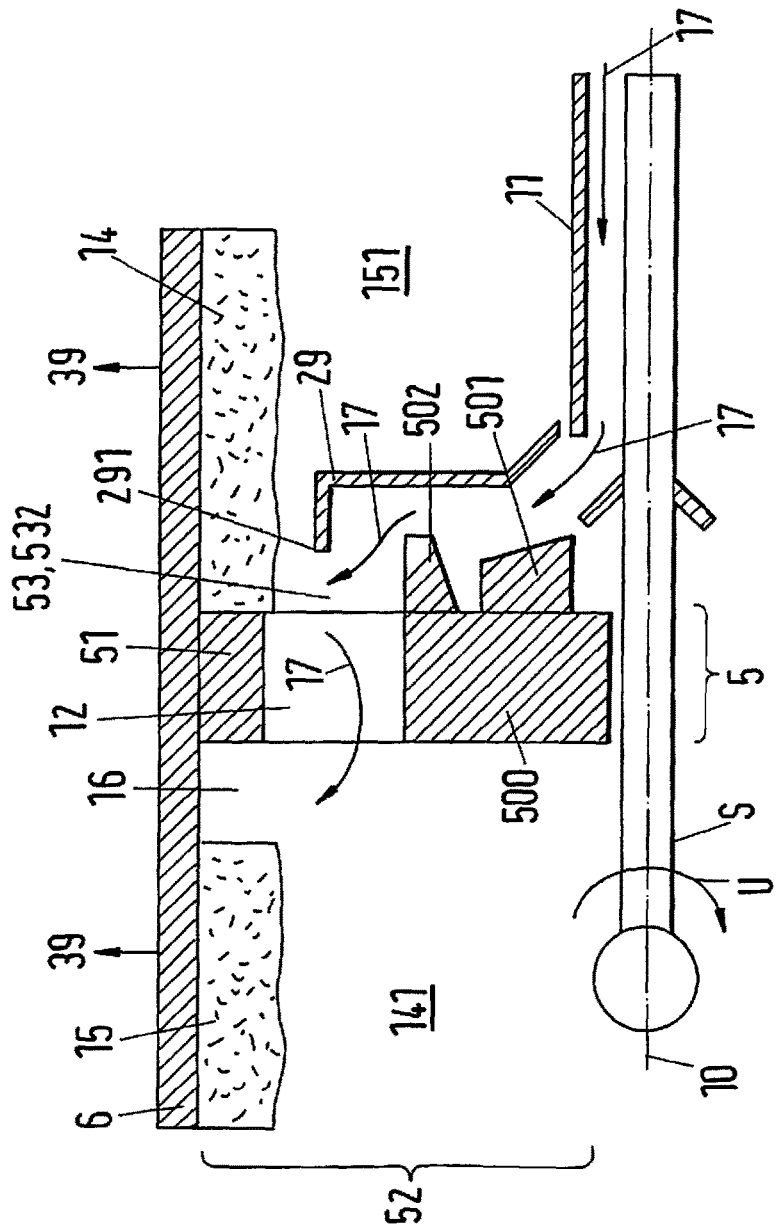
FIG. 5 is a fourth embodiment with a flushing pipe.

A fourth embodiment in accordance with the invention with a flushing pipe S is shown by way of example with respect to FIG. 5, the flushing pipe extending through the feed device 11 and through the pusher base device 5 from the front region 151 into the rear region 141 of the screen drum 6 for the introduction of washing and/or flushing liquid into the screen drum 6. Here, the vanes of the preacceleration device 501 are now assembled over a somewhat larger diameter so that there is still sufficient space available for the flushing pipe S. The flushing pipe S can naturally likewise advantageously be used in an embodiment in accordance with FIG. 2 with an inflow groove 531.

Figure 6:
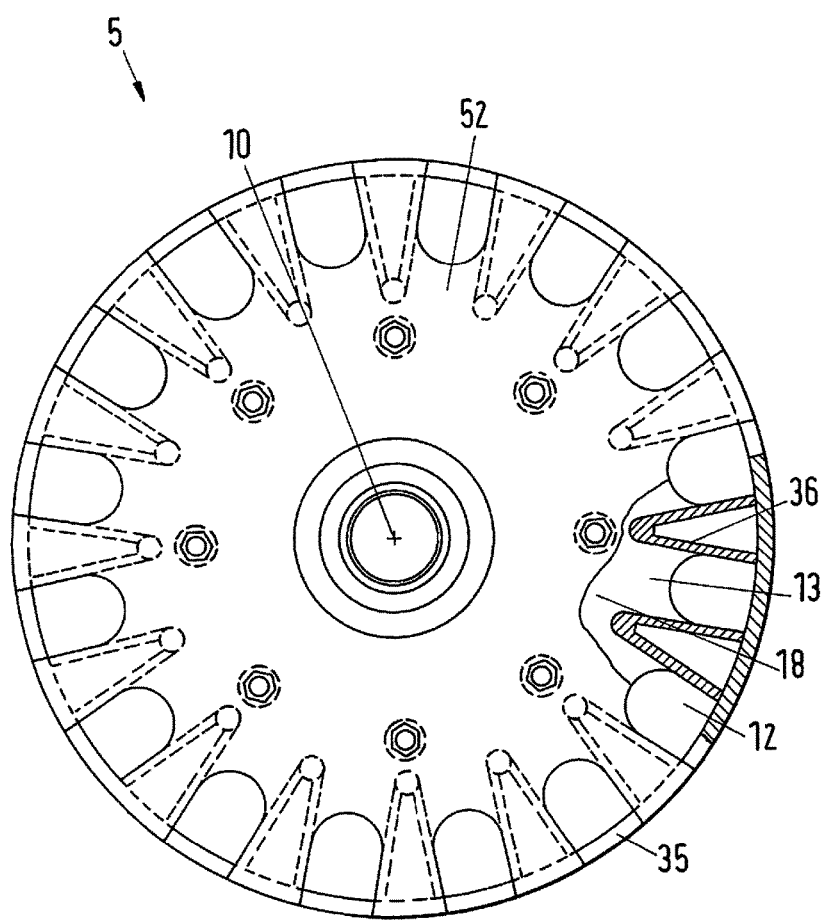
FIG. 6 is a pusher base device in accordance with the invention of double-wall design with a termination band.

A pusher base device 1 in accordance with the invention with a double-wall design and with a termination band 35 is shown schematically with reference to FIG. 6. At least the outer ring region 51 in this respect has a double-wall design and is equipped with a termination band 35 in the direction toward the screen drum 6. The pusher base device 5 of FIG. 6 can specifically be configured as a weld construction in which the feed unit 11 feeds the mixture 17 in the center of the hollow pusher base plate 52, wherein the two plates of the pusher base plate 52 are connected via a termination band 35 at their periphery.

Figure 7:
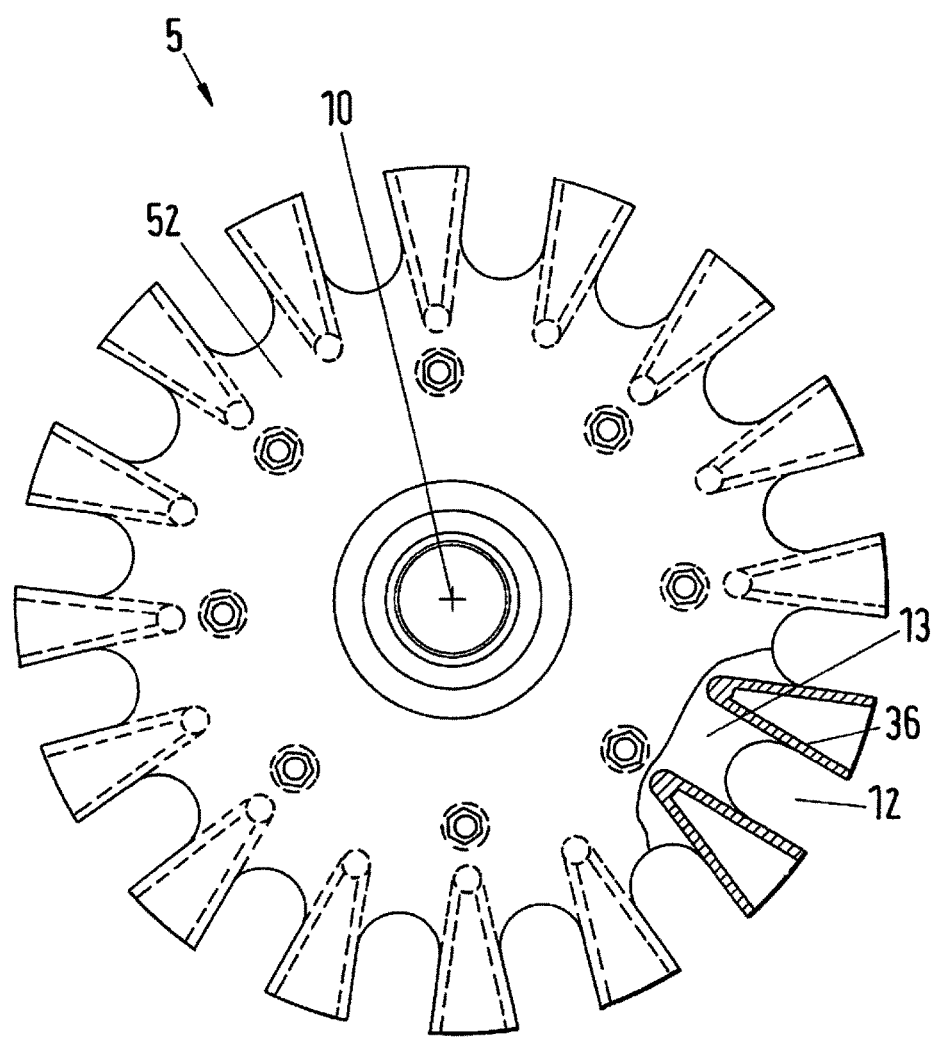
FIG. 7 is a pusher base device in accordance with the invention of double-wall design with an outwardly open ring region.

In contrast, FIG. 7 shows a pusher base device 1 in accordance with the invention of double-wall design with an outwardly open ring region 51. The passage openings 12 of the ring region 51 of double-wall design are, as can easily be recognized, open at their periphery in the direction toward the screen drum 6, i.e. in particular the termination band 35 is missing in contrast to the embodiment of FIG. 6.

It is self-evident that the features of the particularly preferred embodiment variants of embodiments in accordance with the invention previously described by way of example can also be advantageously correspondingly combined as desired in a suitable manner in dependence on the demand and that the skilled person easily understands that further non-inventive further developments are also covered by the claimed protective scope.

What is claimed is:

1. A double-action pusher centrifuge for separating a mixture into a solid cake and a liquid, the double-action pusher centrifuge comprising:
   a screen drum including a front region and a rear region, and being rotatable about an axis of rotation;
   a pusher base device including an outer ring region, being disposed in the screen drum, and being movable to and fro along the axis of rotation so as to alternately displace the solid cake in the screen drum by the outer ring region in an operating state;
   a plurality of axial passage openings disposed in the outer ring region of the pusher base device, and connecting the front region and the rear region of the screen drum;
   an inflow disk;
   a feed unit arranged at the inflow disk, and the feed unit and the inflow disk being configured to introduce the mixture via into an empty space arising on the screen drum on displacement of the solid cake; and
   an inflow gap which is not interrupted in a peripheral direction, being configured to apply the mixture into the empty space on the screen drum, and being disposed between an inflow edge of the inflow disk and a pusher base plate of the pusher base device with an inflow region, the inflow edge of the inflow disk being disposed within the axial passage openings.

2. A double-action pusher centrifuge in accordance with claim 1, wherein the inflow gap is a peripheral inflow groove in the pusher base plate.

3. A double-action pusher centrifuge in accordance with claim 1, wherein the inflow gap is a spacing gap between the inflow edge and the pusher base plate.

4. A double-action pusher centrifuge in accordance with claim 2, wherein the inflow edge extends into the inflow groove.

5. A double-action pusher centrifuge in accordance with claim 1, further comprising
a preacceleration device configured to preaccelerate the mixture in the inflow region of the pusher base device.

6. A double-action pusher centrifuge in accordance with claim 5, further comprising
a valve ring disposed in the inflow region between the preacceleration device and the screen drum.

7. A double-action pusher centrifuge in accordance with claim 1, further comprising
a flushing pipe extending into the screen drum through the feed device and through the pusher base device form the front region into the rear region of the screen drum, and being configured to introduce at least one of washing liquid and flushing liquid into the screen drum.

8. A double-action pusher centrifuge in accordance with claim 1, wherein the pusher base device has a double-walled configuration in the outer ring region.

9. A double-action pusher centrifuge in accordance with claim 8, wherein the ring region includes a termination band in a direction toward the screen drum.

10. A double-action pusher centrifuge in accordance with claim 8, wherein the passage openings of the ring region are open in a direction toward the screen drum.

* * * * *